United States Patent [11] 3,622,583

[72] Inventor Johannes Dehnert
 Ludwigshafen, Germany
[21] Appl. No. 843,776
[22] Filed July 22, 1969
[45] Patented Nov. 23, 1971
[73] Assignee Badische Anilin- & Soda-Fabrik
 Aktiengesellschaft
 Ludwigshafen (Rhine), Germany
[32] Priority July 24, 1968
[33] Germany
[31] P 17 70 960.3

[54] YELLOW DYES OF THE PHTALIMIDOQUINOPHTHALONE SERIES
 2 Claims, No Drawings
[52] U.S. Cl. .................................................. 260/287 R,
 100/288 Q, 260/288 R, 260/289 QP, 260/346.3
[51] Int. Cl. ......................................................... C07d 33/48

[50] Field of Search ............................................. 260/287 R, 289 QP

[56] References Cited
 UNITED STATES PATENTS
 3,301,860 7/1967 Clarke .......................... 260/288 QP
 3,399,028 8/1968 Illy ................................ 260/289 QP
 FOREIGN PATENTS
 480,406 12/1969 Switzerland .................. 260/289 QP Primary Examiner—Donald G. Daus
Attorney—Johnston, Root, O'Keeffe, Keil, Thompson and Shurtleff ABSTRACT: New yellow phthalimidoquinophthalones containing halogen which are outstandingly suitable as pigment dyes.

YELLOW DYES OF THE PHTALIMIDOQUINOPHTHALONE SERIES

This invention relates to new yellow dyes of the phthalimidoquinophthalone series having the general formula:

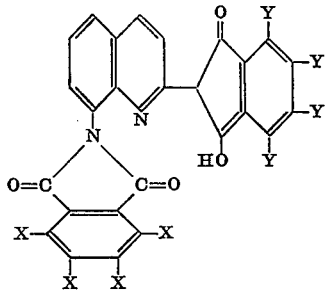

where X and Y each denotes a chlorine or bromine atom.

These quinophthalone derivatives are yellow dyes which are outstandingly suitable as pigment dyes because they are insoluble in water and organic solvents, show excellent fastness to light and are unusually resistant to high temperature.

The new dyes may be prepared for example by heating 8-aminoquinaldine at temperatures of 130° to 300° C. with twice the molar amount of tetrachlorophthalic anhydride or tetrabromophthalic anhydride or simultaneously or successively in any sequence with molar amounts of tetrachlorophthalic anhydride and tetrabromophthalic anhydride, preferably in the presence of solvents or diluents which do not react with the starting materials under the reaction conditions and preferably in the presence of zinc chloride.

Since the amino group of 8-aminoquinaldine reacts preferentially, the two dyes having a tetrachlorophthaloyl group and a tetrabromophthaloyl group can be prepared by successive reaction with the two tetrahalophthalic anhydrides.

Examples of solvents or diluents which do not react with the starting materials -trichlorobenzene, the conditions of the reaction are: orthodichlorobenzene, 1,2,4-tribhlorobenzene, diphenyl ether, diphenyl or mixtures of these substances.

The procedure in the production of the new dyes may be for example as follows: 8-aminoquinaldine is heated with a tetrahalophthalic anhydride at temperatures of from 130° to 300° C. preferably from 150° to 250° C. It is advantageous for the reaction to be carried out in the presence of one of the said solvents or diluents. An addition of anhydrous zinc chloride has proved to be advantageous because it facilitates or accelerates the reaction. It is advantageous to use an amount of zinc chloride equal to from 5 to 50 percent by weight of 8-aminoquinaldine The reaction is over after from about 2 to 3 hours at temperatures of about 200° C.

The reaction product may be worked up for example by filtering off the dye and washing it with a solvent such as dimethylformamide, N-methylpyrrolidone or ethanol.

It may also be advantageous to add these solvents to the reaction mixture prior to the cooling and working up of the same. The dyes are then obtained in a particularly pure form. They can be converted into pigments by dissolution in and reprecipitation from concentrated sulfuric acid and/or other methods usual in pigment technology.

The new dyes have high fastnesses, in particular outstanding light fastness, good resistance to high temperature and excellent fastness to solvents. Because of these advantageous properties the new dyes are very suitable as pigments, for example for the production of surface coatings and printing inks and also for the mass coloration of thermoplastics such as polystyrene, polyvinyl chloride, polyamides, polyesters, polyacrylonitrile, cellulose triacetate and cellulose acetate.

The invention is illustrated by the following examples. The parts and percentages specified in the examples are by weight. Parts by volume have the same relation to parts by weight as the liter to the kilogram.

EXAMPLE 1

A mixture of 158 parts of 8-aminoquinaldine, 858 parts of tetrachlorophthalic anhydride, 40 parts of anhydrous zinc chloride and 2000 parts by volume of trichlorobenzene is boiled for 3 hours, steam being allowed to escape through a short air cooler. The boiling temperature at the end is 220° C. Five hundred parts by volume of dimethylformamide is then added and the whole is stirred for an hour under reflux at about 175° C. The product is suction filtered while hot at 150° to 160° C. and the yellow reaction product is washed with 1000 parts by volume of dimethylformamide and at the end with ethanol, and dried. The yellow dye having the formula:

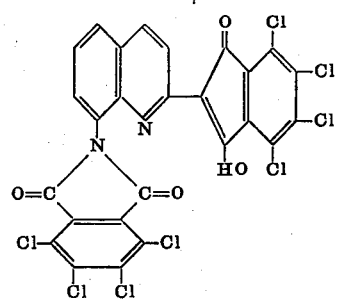

is obtained which is yellow pigment having high fastness to light, solvents and high temperature.

EXAMPLE 2

Eight parts of 8-aminoquinaldine and 58 parts of tetrabromophthalic anhydride are heated at 200° to 205° C. with two parts of anhydrous zinc chloride and 200 parts by volume of trichlorobenzene for 2 hours while stirring. One hundred parts by volume of dimethylformamide is added and the product filtered at 120° C. The yellow filter cake is washed, first with dimethylformamide and then with alcohol, and dried. The dye obtained as a yellow powder and having the formula:

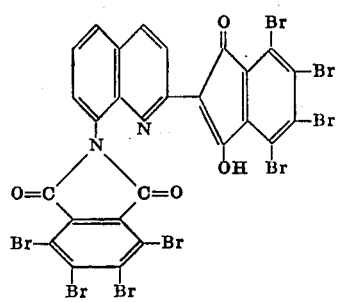

is a yellow pigment having high fastness to light, solvents and high temperature.

EXAMPLE 3

A mixture of 16 parts of 8-aminoquinaldine, 30 parts of tetrachlorophthalic anhydride and 200 parts by volume of trichlorobenzene is stirred for 6 hours at 140° C., the water formed being allowed to escape as steam from the flask, Then 50 parts of tetrabromophthalic anhydride, 4 parts of anhydrous zinc chloride and 100 parts by volume of trichlorobenzene are added and the mixture is heated for 3 hours at 210° C. Then 100 parts of dimehtylformamide is allowed to drip in and the whole is kept at 170° C. for 30 minutes. The yellow dye formed is suction filtered at 120° C. and then washed with hot alcohol and dried. It has the composition:

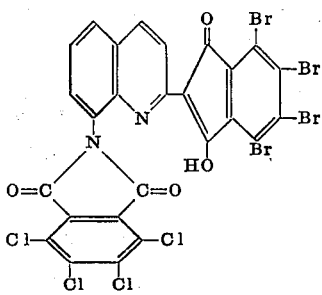

EXAMPLE 4

Forty-eight parts of tetrabromophthalic anhydride and 18 parts of 8-aminoquinaldine are heated together with 200 parts by volume of trichlorobenzene for 3 hours at 150° C. while stirring. Thirty parts of tetrachlorophthalic anhydride and four parts of anhydrous zinc chloride are added and the reaction mixture is brought to 205° to 210° C. and kept at this temperature for 5 hours. Seventy-five parts by volume of dimethylformamide is added in the course of half an hour, the internal temperature falling to 180° C. After cooling to 130° C., the reaction product is suction filtered, washed with dimethylformamide and alcohol and dried at 100° C. The yellow dye thus obtained has the formula:

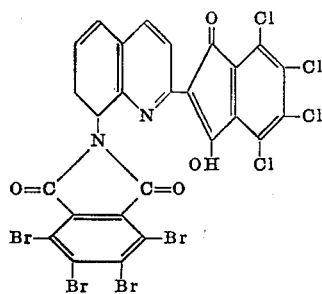

EXAMPLE 5

A mixture of 16 parts 8-aminoquinaldine, 15 parts of tetrachlorophthalic anhydride and 24 parts of tetrabromophthalic anhydride is heated to 150° C. and this temperature is maintained for 4 hours while stirring with the flask left open. Then another 15 parts of tetrachlorophthalic anhydride and 24 parts of tetrabromophthalic anhydride are added together with five parts of anhydrous zinc chloride. The whole is heated to 210° to 220° and kept at this temperature for 4 hours. The reaction product (isolated analogously to example 3) consists of a mixture of the dyes described in examples 1, 2, 3 and 4.

I claim:

1. A yellow dye having the formula:

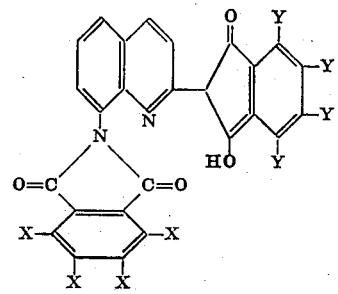

where X and Y each denotes a chlorine or bromine atom.

2. The dye having the formula:

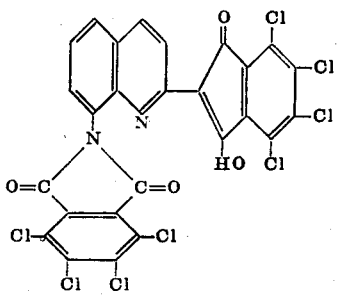

* * * * *

PO-1050
(5/69)

UNITED STATES PATENT OFFICE
CERTIFICATE OF CORRECTION

Patent No. 3,622,583    Dated November 23, 1971

Inventor(s) Johannes Dehnert

It is certified that error appears in the above-identified patent and that said Letters Patent are hereby corrected as shown below:

Column 1, line 38, "-trichlorobenzene," should read -- under --; line 39, "1,2,4-tribhlorobenzene" should read -- 1,2,4-trichlorobenzene --.

Column 2, line 19, that portion of the formula reading " | " should read --   |   --; line 71, "dimehtylformamide"         HO
                                                          HO should read -- dimethylformamide --.

Column 4, lines 15 to 26, the formula should read
--                                                                 --.

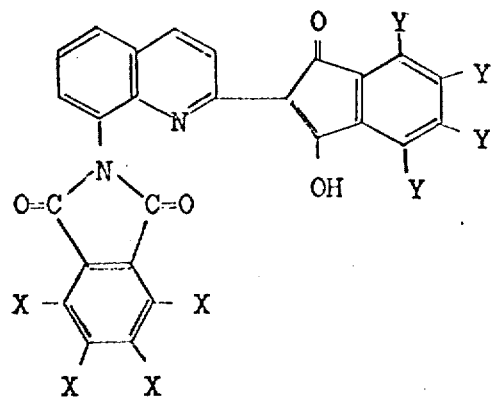

Signed and sealed this 16th day of May 1972.

(SEAL)
Attest:

EDWARD M. FLETCHER, JR.          ROBERT GOTTSCHALK
Attesting Officer                Commissioner of Patents